United States Patent
Yamaki et al.

(10) Patent No.: US 11,538,603 B2
(45) Date of Patent: Dec. 27, 2022

(54) METHOD FOR PRODUCING TRANSPARENT CONDUCTING FILM

(71) Applicant: SHOWA DENKO K.K., Tokyo (JP)

(72) Inventors: Shigeru Yamaki, Tokyo (JP); Shuhei Yoneda, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 17/763,067

(22) PCT Filed: May 29, 2020

(86) PCT No.: PCT/JP2020/021400
§ 371 (c)(1),
(2) Date: Mar. 23, 2022

(87) PCT Pub. No.: WO2021/131099
PCT Pub. Date: Jul. 1, 2021

(65) Prior Publication Data
US 2022/0344072 A1    Oct. 27, 2022

(30) Foreign Application Priority Data
Dec. 27, 2019  (JP) .............................. JP2019-238102

(51) Int. Cl.
*B32B 37/14*    (2006.01)
*B82Y 40/00*    (2011.01)
(Continued)

(52) U.S. Cl.
CPC .............. *H01B 1/22* (2013.01); *B32B 37/14* (2013.01); *H01B 5/14* (2013.01); *B82Y 30/00* (2013.01); *B82Y 40/00* (2013.01)

(58) Field of Classification Search
CPC ........ B41M 3/006; B82Y 40/00; B82Y 30/00; H01B 5/14; H01B 13/0036
(Continued)

(56) References Cited

U.S. PATENT DOCUMENTS

2017/0015857 A1 *   1/2017   Kodama .............. C09D 11/107

FOREIGN PATENT DOCUMENTS

JP    2006021468 A  *  1/2006   ........... C09D 11/107
JP    2011-90879 A      5/2011
(Continued)

OTHER PUBLICATIONS

International Search Report of PCT/JP2020/021400 dated Aug. 11, 2020 [PCT/ISA/210].

*Primary Examiner* — Tri V Nguyen
(74) *Attorney, Agent, or Firm* — Sughrue Mion, PLLC (57) ABSTRACT

Provided is a transparent conducting film containing metal nanowires, the conducting film having a preferable optical property, electrical property, and having almost no in-plane resistance anisotropy.

A method for producing a transparent conducting film provided with a conducting layer containing a metal nanowire and a binder resin, comprising steps of: preparing a coating liquid containing the metal nanowire and the binder resin, and coating the coating liquid on one main face of a transparent substrate, the coating step being performed by a bar-coater with a bar which has a bar surface constituted by a material having a friction coefficient of 0.05 to 0.45, wherein when the coating liquid is coated on one main face of the transparent substrate by the bar, a relative moving velocity (coating velocity) V (mm/sec) of the transparent substrate relative to the bar satisfies $2000 \geq V \geq 350$, a groove formed on the bar has a pitch (P) and a depth (H) which satisfy a ratio P/H of 9 to 30, and on the bar surface, the groove is formed to be inclined in a way so that an angle between the longitudinal direction of the bar and a direction that the groove is formed is in a range of 60° to 88°.

4 Claims, 3 Drawing Sheets

(51) Int. Cl.
*H01B 1/22* (2006.01)
*H01B 5/14* (2006.01)
*B82Y 30/00* (2011.01)

(58) Field of Classification Search
USPC .......................................................... 427/108
See application file for complete search history.

(56) References Cited

FOREIGN PATENT DOCUMENTS

| | | | |
|---|---|---|---|
| JP | 2014-507746 A | 3/2014 | |
| JP | 2015-028874 A | 2/2015 | |
| JP | 6732161 B1 | 7/2020 | |
| WO | 2012/005205 A1 | 1/2012 | |
| WO | 2013/121556 A1 | 8/2013 | |
| WO | WO-2015177963 A1 * | 11/2015 | ............... B05D 1/26 |
| WO | 2018/096977 A1 | 5/2018 | |
| WO | 2019/026829 A1 | 2/2019 | |

* cited by examiner

METHOD FOR PRODUCING TRANSPARENT CONDUCTING FILM

CROSS REFERENCE TO RELATED APPLICATIONS

This application is a National Stage of International Application No. PCT/JP2020/021400, filed May 29, 2020, claiming priority to Japanese Patent Application No. 2019-238102, filed Dec. 27, 2019.

TECHNICAL FIELD

The present disclosure relates to a method for producing a transparent conducting film. In more detail, the present disclosure relates to a method for producing a transparent conducting film containing metal nanowires by a bar-coat printing method.

BACKGROUND ART

A transparent conducting layer (transparent conducting film) is used in various fields, such as a liquid crystal display (LCD), a plasma display panel (PDP), an organic electroluminescence display, a transparent electrode for a photovoltaic cell (PV) and a touch panel (TP), an electrostatic discharge (ESD) film, electromagnetic interference (EMI) film, and the like. For such transparent conducting films, conventionally, films using ITO (indium tin oxide) have been used.

Recently, touch panels are adopted for smartphones, car navigation systems, vending machines, etc. In particular, since a foldable smartphone attracts attention, there is a desire for a foldable touch panel.

In order to achieve a foldable touch panel, a foldable transparent conducting film, that is, a transparent conducting film having a superior durability of folding is necessary. Therefore, a metal nanowire film has been developed as a transparent conducting film for the next generation.

Patent Document 1 discloses a method for producing a transparent conducting film using a slot die coater having a slot die in the silver nanowire ink coating step. In order to solve the in-plane resistance anisotropy, a shear velocity (printing speed/gap between a slot die head tip and a film) is specified. However, the printing speed is restricted by the ability of a production equipment (in particular, a drying equipment).

Patent Document 2 discloses a slot die coater as a coater used in a silver nanowire ink coating step, and discloses that, in order to solve the in-plane resistance anisotropy, blowing air to the substrate in a direction different from the printing direction, during the drying step, is effective. However, an equipment for blowing air from the different direction is additionally required.

Patent Document 3 discloses gravure printing as a silver nanowire ink coating step, but fails to disclose or suggest a solution for the in-plane resistance anisotropy.

PRIOR ARTS

Patent Document

Patent Document 1: Japanese Unexamined Patent Publication (Kokai) No. 2011-090879
Patent Document 2: WO 2013/121556 pamphlet
Patent Document 3: Japanese Unexamined Patent Publication (Kohyo) No. 2014-507746

SUMMARY

In the production of transparent conducting films using metal nanowire ink, there are drawbacks that the resistance value ($R_{MD}$) in the printing direction is different from the resistance value ($R_{TD}$) in the direction perpendicular to the printing direction, that is, anisotropy occurs. In order to solve this problem, the applicant of the present disclosure found out that bar-coat printing using a wireless bar having a specific groove shape is effective. However, there are drawbacks that a longitudinal line is often shown on the coating face when the coating velocity increases, and thus, there is still room for improvement.

One of the objectives of the present disclosure is to provide a transparent conducting film containing metal nanowires, which has a superior optical property and a superior electrical property, as well as a small in-plane resistance anisotropy, and which can overcome the drawbacks that a longitudinal line is shown on the coating face when the coating velocity increases.

The present disclosure includes the following aspects.

[1] A method for producing a transparent conducting film provided with a conducting layer containing a metal nanowire and a binder resin, comprising steps of preparing a coating liquid containing the metal nanowire and the binder resin, and coating the coating liquid on one main face of a transparent substrate, the coating step being performed by a bar-coater with a bar which has a bar surface constituted by a material having a friction coefficient of 0.05 to 0.45, wherein, when the coating liquid is coated on one main face of the transparent substrate by the bar, a relative moving velocity (coating velocity) V (mm/sec) of the transparent substrate relative to the bar satisfies $2000 \geq V \geq 350$, a groove formed on the bar has a pitch (P) and a depth (H) which satisfy a ratio P/H of 9 to 30, and on the bar surface, the groove is formed to be inclined in a way so that an angle between the longitudinal direction of the bar and a direction that the groove is formed is in a range of 60° to 88°.

[2] A method for producing a transparent conducting film according to [1], wherein the metal nanowire has an average length of 1 to 100 μm, and an average diameter of 1 to 500 nm.

[3] A method for producing a transparent conducting film according to [1] or [2], wherein the coating liquid has a viscosity in a range of 1 to 50 mPa·s at 25° C.

According to a method for producing a transparent conducting film of the present disclosure, a transparent conducting film having almost no in-plane resistance anisotropy can be provided.

ASPECT OF DISCLOSURE

Hereinbelow, aspects of the present disclosure (hereinbelow, referred to as aspects) will be explained.

A method for producing a transparent conducting film according to the present aspect comprising steps of preparing a coating liquid containing a metal nanowire and a binder resin, and coating the coating liquid on one main face of a transparent substrate (transparent film), wherein, in the coating step, printing is performed using a bar-coater with a bar which has a bar surface made of a material having a friction coefficient of 0.05 to 0.45, a relative moving velocity (coating velocity) V (mm/sec) of the transparent substrate relative to the bar satisfies 2000≥V≥350 when the coating liquid is coated on one main face of the transparent substrate, a groove formed on the bar has a pitch (P) and a depth (H) which satisfy a ratio P/H of 9 to 30, and on the bar surface, the groove is formed to be inclined in an angle range of 60° to 88° relative to the longitudinal direction of the bar. By the above method for producing a transparent conducting film, a transparent conducting film provided with a conducting layer containing a metal nanowire and a binder resin, formed on the transparent substrate, can be produced.

Further, a protection film mentioned below can be formed on a transparent conducting film produced by the above method for producing a transparent conducting film.

<Transparent Substrate>

The above transparent substrate may be colored, but having higher total light transmittance (transparency to visible light) is preferable, and a preferable total light transmittance is 80% or more. For example, a resin film such as polyester (polyethylene terephthalate [PET], polyethylene naphthalate [PEN], etc.), polycarbonate, acrylic resin (poly methyl methacrylate [PMMA], etc.), cyclo olefin polymer, and the like may be preferably used. As far as the optical property, electric property, and durability of folding is not damaged, the transparent substrate may be provided with a single or a plurality of layers having functions of easy adhesion, optical adjustment (antiglare, antireflection, etc.), hard coating, and the like, on one or both of the main faces of the transparent substrate. Among these resin films, in view of a superior light transmittance (transparency), flexibility, and a mechanical property, etc., using polyethylene terephthalate, a cyclo olefin polymer is preferable. For polyethylene terephthalate, COSMOSHINE (registered trademark, manufactured by Toyobo Co., Ltd.) can be used. For the cyclo olefin polymer, a hydrogenated ring-opening metathesis polymerization type cyclo olefin polymer of norbornene (ZEONOR (registered trademark, manufactured by Zeon Corporation), ZEONEX (registered trademark, manufactured by Zeon Corporation), ARTON (registered trademark, manufactured by JSR Corporation), etc.) and a norbornene/ethylene addition copolymerization type cyclo olefin polymer (APEL (registered trademark, manufactured by Mitsui Chemicals, Inc.), TOPAS (registered trademark, manufactured by Polyplastics Co., Ltd.)) can be used. Specific examples include COSMOSHINE A4100, A4160, and ZEONOR ZF-14, ZF-16, ARTON RX4500, RH4900, R5000. The thickness of the transparent substrate may vary depending on the use thereof, but preferably, a thickness of 10 to 200 μm is used. In the present specification, the term "transparent" refers to a total light transmittance of 70% or higher.

<Metal Nanowire>

As a conductive material constituting the conducting layer formed on the transparent substrate, using metal nanowires is preferable. The metal nanowire is metal having a diameter in the order of nanometer, and is a conductive material having a wire shape. In the present aspect, together with (mixing with) the metal nanowires, or instead of the metal nanowires, a metal nanotube which is a conductive material having a porous or nonporous tubular shape can be used. In the present specification, both the "wire" shape and the "tubular" shape refer to a linear shape, and the former is not hollow, whereas the latter is hollow. They may be soft or rigid. The former is referred to as "metal nanowire in a narrow sense", and the latter is referred to as "metal nanotube in a narrow sense". Hereinbelow, in the present specification, "metal nanowire" is used to include both the metal nanowire in a narrow sense and the metal nanotube in the narrow sense. Either the metal nanowire in a narrow sense or the metal nanotube in a narrow sense may be used solely, but they may be mixed.

In the present specification, the "conducting layer" refers to a layer in the shape of a thin film including the above metal nanowires and the below-mentioned binder resin, with a thickness of in the range of 20 to 200 nm, but is not limited to the layer having a uniform thickness.

As a method for producing the metal nanowire, a known method may be applied. For example, silver nanowires may be synthesized by reducing the silver nitrate under the presence of polyvinylpyrrolidone, using a polyol method (refer to Chem. Mater., 2002, 14, 4736). Similarly, gold nanowires may be synthesized by reducing the gold chloride acid hydrate under the presence of polyvinylpyrrolidone (refer to J. Am. Chem. Soc., 2007, 129, 1733). WO 2008/073143 pamphlet and WO 2008/046058 pamphlet have detailed description regarding the technology of large scale synthesis and purification of silver nanowires and gold nanowires. Gold nanotubes having a porous structure may be synthesized by using silver nanowires as templates, and reducing a gold chloride acid solution. The silver nanowires used as templates are dissolved in the solution by oxidation-reduction reaction with the gold chloride acid, and as a result, gold nanotubes having a porous structure can be produced (refer to J. Am. Chem. Soc., 2004, 126, 3892-3901).

The metal nanowires have an average diameter size (average diameter) of preferably 1 to 500 nm, more preferably 5 to 200 nm, still more preferably 5 to 100 nm, and particularly preferably 10 to 50 nm. The metal nanowires have an average major axis length (average length) of preferably 1 to 100 μm, more preferably 1 to 80 μm, still more preferably 2 to 70 μm, and particularly preferably 5 to 50 μm. While satisfying the above ranges of the average diameter size and the average major axis length, the metal nanowires have an average aspect ratio of preferably more than 5, more preferably 10 or more, still more preferably 100 or more, and particularly preferably 200 or more. Here, the aspect ratio refers to a value obtained by a/b, wherein "b" represents an average diameter size of the metal nanowire and "a" represents an average major axis length thereof. The values "a" and "b" may be measured by a scanning electron microscope (SEM) and an optical microscope. Specifically, "b" (average diameter) is obtained by measuring diameters of any selected 100 silver nanowires respectively using the Field Emission Scanning Electron Microscope JSM-7000F (manufactured by JEOL Ltd.), and calculating the arithmetic average thereof. Further, "a" (average length) is obtained by measuring lengths of any selected 100 silver nanowires respectively using the Shape Measurement Laser Microscope VK-X200 (manufactured by Keyence Corporation), and calculating the arithmetic average thereof.

The kind of the metal as a material for the metal nanowires may be at least one selected from the group consisting of gold, silver, platinum, copper, nickel, iron, cobalt, zinc, ruthenium, rhodium, palladium, cadmium, osmium, and iridium, or may be an alloy etc., formed by combining some of these. In order to obtain a coating film having a low surface resistance and a high total light transmittance, containing at least one of gold, silver, and copper is preferable. These metals have a high conductivity, and thus, when a certain surface resistance should be obtained, the density of the metal within the surface may be reduced, and high total light transmittance can be achieved. Among these metals, containing at least gold or silver is more preferable. The most appropriate example may be the silver nanowire.

The conducting layer includes the metal nanowires and a binder resin. As for the binder resin, any transparent binder can be used with no limitation. In case that metal nanowire produced by the poly-ol method is used as a conductive material, a binder resin soluble in alcohol or water is preferable, in view of the compatibility to the solvent for production (polyol). In the present specification, the expression "soluble in alcohol or water" refers to the fact that 0.1 g or more binder resin can be solved in 1 L of alcohol or water. Specifically, the binder may be poly-N-vinyl pyrrolidone, a water-soluble cellulose resin such as methyl cellulose, hydroxyethyl cellulose, carboxymethyl cellulose, and the like, a butyral resin, or poly-N-vinylacetamide (PNVA (registered trademark)). The above resin may be used solely, or two or more kinds of the resin may be used in combination. When two or more kinds of the resin are used, they may be simply mixed, or may be copolymerized. Poly-N-vinylacetamide is a homopolymer of N-vinylacetamide (NVA), but a copolymer having 70 mol % or more of N-vinylacetamide (NVA) may also be used. Examples of a monomer which can be copolymerized with NVA include: N-vinylformamide, N-vinylpyrrolidone, acrylic acid, methacrylic acid, sodium acrylate, sodium methacrylate, acrylamide, acrylonitrile, and the like. The more the content of the copolymerized component, the higher the sheet resistance of the transparent conductive pattern to be obtained, the lower the adhesion between the silver nanowires and the substrate, and the lower the heat resistance (thermal decomposition starting temperature). Therefore, the polymer contains the monomer unit derived from N-vinylacetamide preferably 70 mol % or more, more preferably 80 mol % or more, and still more preferably 90 mol % or more. The polymer (homopolymer or copolymer) including N-vinylacetamide as a monomer unit has a weight average molecular weight in terms of absolute molecular weight of preferably 30,000 to 4,000,000, more preferably 100,000 to 3,000,000, and still more preferably 300,000 to 1,500,000. The absolute molecular weight is measured by the following method.

<Molecular Weight Measurement>

The binder resin was dissolved in the following eluent, which was left to stand still for 20 hours. The concentration of the binder resin in the resultant solution was 0.05% by mass.

The solution was filtered by a 0.45 μm membrane filter, the filtrate was measured by GPC-MALS, and a weight-average molecular weight based on the absolute molecular weight was calculated.

GPC: Shodex (registered trademark) SYSTEM 21, manufactured by Showa Denko K.K.

Column: TSK gel (registered trademark) G6000PW, manufactured by Tosoh Corporation Column Temperature: 40° C.

Eluent: 0.1 mol/L of $NaH_2PO_4$ aqueous solution+0.1 mol/L of $Na_2HPO_4$ aqueous solution Flow Rate: 0.64 mL/min Sample Injection Volume: 100 μL MALS Detector: DAWN (registered trademark) DSP, manufactured by Wyatt Technology Corporation Laser Wavelength: 633 nm Multi-Angle Fitting Method: Berry Method The conducting layer is formed by printing, as a coating liquid, a conductive ink (metal nanowire ink) containing the metal nanowires, the binder resin, and the solvent on at least one main face of the transparent substrate, and drying and removing the solvent.

The solvent is not particularly limited as far as the solvent has a superior metal nanowire dispersibility, and the binder resin can be dissolved in the solvent. However, when the metal nanowire synthesized by the poly-ol method is used as the conductive material, alcohol, water or a mixture solvent of alcohol and water is preferable, in view of the compatibility to the solvent used for production (polyol). As mentioned above, a preferable binder resin is also a binder resin soluble to alcohol, water, or a mixture solvent of alcohol and water. The mixture solvent of alcohol and water is more preferable because the drying speed of the binder resin can be easily controlled. The alcohol contains at least one kind of saturated monohydric alcohols having 1 to 3 carbon atoms (methanol, ethanol, n-propanol, and isopropanol), which are represented by $C_nH_{2n+1}OH$ (n being an integer of 1 to 3) (hereinbelow, simply referred to as saturated monohydric alcohol having 1 to 3 carbon atoms). Containing 40% by mass or more of the saturated monohydric alcohol having 1 to 3 carbon atoms in the alcohol in total is preferable. Using the saturated monohydric alcohol having 1 to 3 carbon atoms is advantageous because drying process becomes easy.

Alcohols other than the saturated monohydric alcohol having 1 to 3 carbon atoms, represented by $C_nH_{2n+1}OH$ (n being an integer of 1 to 3) can be used together. Examples of other alcohols which can be used together with the saturated monohydric alcohol having 1 to 3 carbon atoms, represented by $C_nH_{2n+1}OH$ (n being an integer of 1 to 3), include ethylene glycol, propylene glycol, ethylene glycol monomethylether, ethylene glycol monoethylether, propylene glycol monomethylether, propylene glycol monoethylether, and the like. Using such alcohol together with the above-mentioned saturated monohydric alcohol having 1 to 3 carbon atoms represented by $C_nH_{2n+1}OH$ (n being an integer of 1 to 3) is advantageous because the drying speed can be adjusted. Further, the content of the alcohol in total in the mixture solvent is preferably 5% to 90% by mass. When the alcohol content in the mixture is less than 5% by mass, or more than 90% by mass, there are drawbacks that a stripe pattern (uneven coating) is generated at the time of coating.

The conductive ink can be produced by stirring and mixing the binder resin, the metal nanowires, and the solvent, using a planetary centrifugal stirrer, and the like. The content of the binder resin in the conductive ink is preferably in the range of 0.01% to 1.0% by mass. The content of the metal nanowire in the conductive ink is preferably in the range of 0.01% to 1.0% by mass. The content of the solvent in the conductive ink is preferably in the range of 98.0% to 99.98% by mass. By the above composite, a conductive ink having a viscosity of 1 to 50 mPa·s can be obtained. By printing the ink on the main face of the transparent substrate, and drying/removing the solvent, a conducting layer having a film thickness of 20 to 200 nm can be obtained. The viscosity of the conductive ink is more preferably 1 to 20 mPa·s, and still more preferably 1 to 10 mPa·s. The viscosity was measured by the digital viscometer DV-E (spindle: SC4-18) manufactured by Brookfield, at 25° C.

A method for producing the transparent conducting film (method for printing the conductive ink) may be a bar-coating method, a gravure printing method, an ink-jet method, a slit-coating method, and the like. Among them, the bar-coating method has a preferable coating ability of a low-viscosity ink, and a superior property for forming a thin film. Further, unlike the ink-jet method, the bar-coating method can print a low-viscosity ink containing inorganic or metal particles, without causing clogging.

A method for producing a transparent conducting film according to the present aspect has steps of coating the above-mentioned conductive ink on at least one face (one main face) of the transparent substrate by a bar-coating method, and drying the same. The coating is preferably performed within a range of 20 to 30° C. under an air atmosphere. The drying performed after the coating is preferably performed within a range of 60 to 100° C., under an air atmosphere, for 1 to 10 minutes. The bar used for a bar coater includes a Meyer bar (or wire bar) having a wire wounded therearound, or a wireless bar having no wire but having a groove formed on the bar by shaving. Because of the reasons mentioned below, the wireless bar is preferable. The velocity V (mm/sec) that the conductive ink is coated on at least one face (one main face) of the transparent substrate by the bar-coating method (hereinafter, referred to as "coating velocity") is a relative moving velocity of the bar relative to the transparent substrate. That is, a moving velocity of the bar relative to the transparent substrate during the coating, or a transferring velocity of the transparent substrate relative to the bar. V (mm/sec) satisfies $2000 \geq V \geq 350$. When V (mm/sec) is $V \geq 350$ (350 or more), it is possible to produce a transparent conducting film having a small in-plane resistance anisotropy of the conducting layer, at a high productivity. Also, when V (mm/sec) is $2000 \geq V$ (2000 or less), it is possible to form a conducting layer having a small in-plane resistance anisotropy without causing uneven coating (blurring, etc.). The value of V (mm/sec) is more preferably $1000 \geq V \geq 350$, and still more preferably $700 \geq V \geq 350$.

Figure 1A:
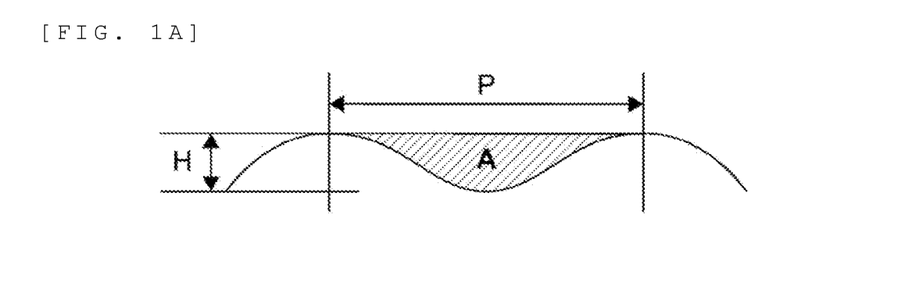
FIGS. 1A to 1C is are schematic views explaining a shape of a groove formed on a bar used in a bar coater.
Figure 1B:
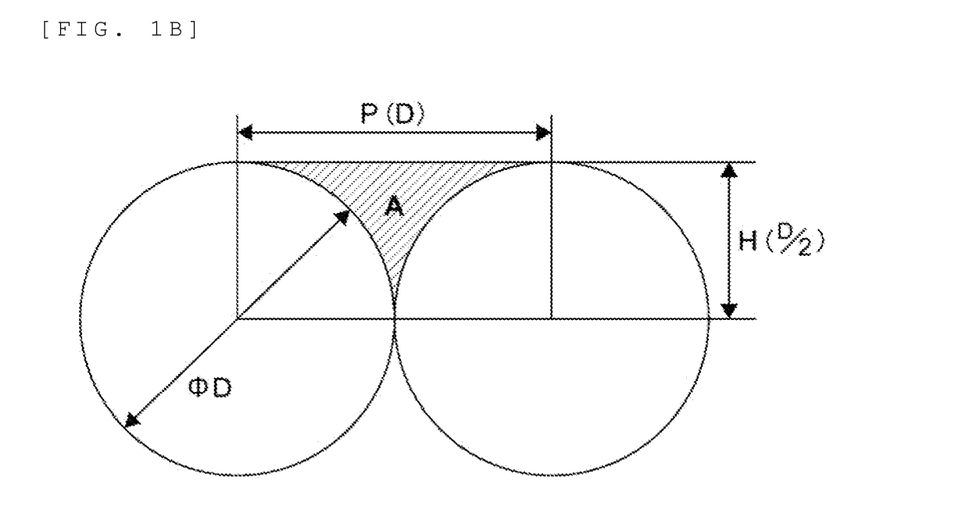
Figure 1C:
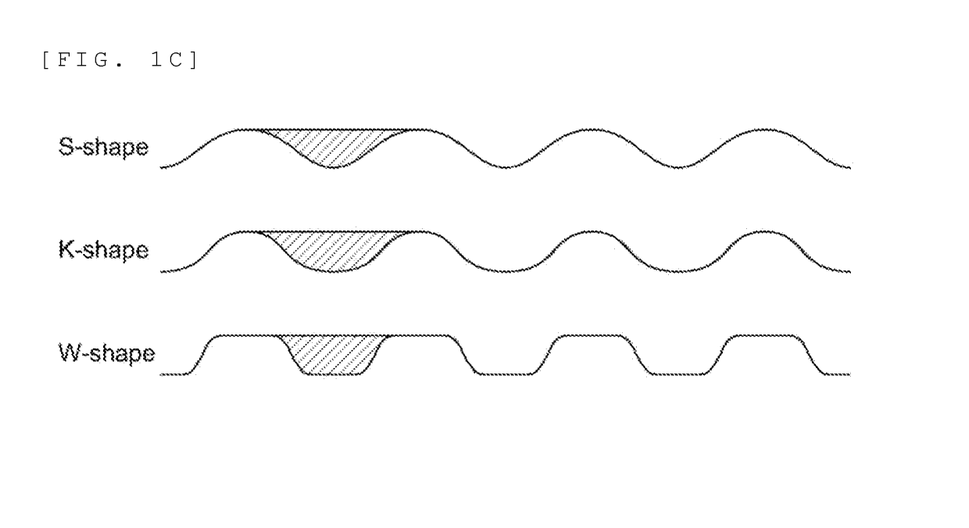

FIG. 1A, FIG. 1B, and FIG. 1C show schematic views explaining the shape of a groove formed on a bar used in a bar coater. FIG. 1A shows an example of a wireless bar, and FIG. 1B shows an example of Meyer bar (or a wire bar). FIG. 1C shows an example of a groove shape of a marketed wireless bar.

In FIG. 1A and FIG. 1B, P is a pitch of a groove, H is a depth of a groove, and A is a cross-sectional area of a pocket formed by the groove. In the wireless bar shown in FIG. 1A, the groove is formed by cutting, and thus P and H can be adjusted as desired. On the other hand, the Meyer bar shown in FIG. 1B is produced by winding a wire with a diameter D around a bar, and thus, P should be D, and H should be D/2.

As shown in the below-mentioned Examples, when the groove of the bar has a pitch (P) and a depth (H) satisfying a ratio (P/H) of 9 to 30, the in-plane resistance anisotropy of the conducting layer can be decreased, compared to the case that Meyer bar is used. As mentioned above, when Meyer bar is used, P/H is fixed to P/H=D/(D/2)=2. Whereas, using a wireless bar is preferable in the point that P and H can be set as desired, and the value of P/H can be adjusted to 9 to 30. The value of P/H is preferably 9.5 to 20, and more preferably 10 to 15.

The groove of the wireless bar can have a various shape as far as the pitch (P) and the depth (H) satisfy the ratio (P/H) of 9 to 30. For example, as shown in FIG. 1C, the groove may have a S-shape (smooth curved shape), a K-shape (with a slightly flat bottom), and a W-shape (with a slightly flat top and a slightly flat bottom), and all of these shapes can be found in marketed products.

The inventor of the present disclosure found out that a material forming the wireless bar surface which contacts the transparent substrate has an influence on the anisotropy of the resistance value within a plane of the conducting layer formed by bar-coat printing. Namely, the inventor of the present disclosure found out that by using a wireless bar having a surface constituted by a material having a friction coefficient of 0.05 to 0.40, obtained by the below-mentioned measurement method, for bar-coat printing, a conducting layer having a smaller anisotropy of the resistance value within a plane (in-plane resistance anisotropy) can be obtained. It is assumed that the use of a wireless bar having the above friction coefficient range induces the phenomenon that the conductive ink favorably flows not only in the printing direction (longitudinal direction) but also in the direction perpendicular to the printing direction (lateral direction). The friction coefficient is more preferably 0.05 to 0.30, and still more preferably 0.05 to 0.20. A wireless bar made of a material having the above friction coefficient can be used. However, a wireless bar having a surface made of a generally used material (SUS, etc.) can be subjected to various surface treatments to adjust the friction coefficient to the above range. Examples of such treatments include: hard chrome plating with a friction coefficient of 0.7, electroless nickel plating with a friction coefficient of 0.3, electroless nickel-PTFE plating with a friction coefficient of 0.25, and Diamond-Like Carbon treatment with a friction of 0.15. Note that SUS304 without any surface treatments has a friction coefficient of 0.45. All of the friction coefficients are catalog values, and the surface-treated wireless bars are commercially available.

The friction coefficient is measured by a ball-on-disk tribometer in accordance with JIS R1613. The material of the ball is SUS304, and a substrate made of a material same as the material of the wireless bar or a substrate surface-treated by a material same as the material of the wireless bar is used as a disk. A friction coefficient is calculated by measuring a frictional force generated by disk rotation by a sensor, and dividing the measured value by an applied load.

The inventor of the present disclosure further studied, and found out that inclining the groove forming direction relative to the longitudinal direction of the bar to have an angle in a specific range therebetween can also be effective for obtaining a conducting layer having a smaller anisotropy of the resistance value within a plane (in-plane resistance anisotropy), and for obtaining a transparent conducting film having a preferable appearance with no stripes (longitudinal lines).

Figure 3:
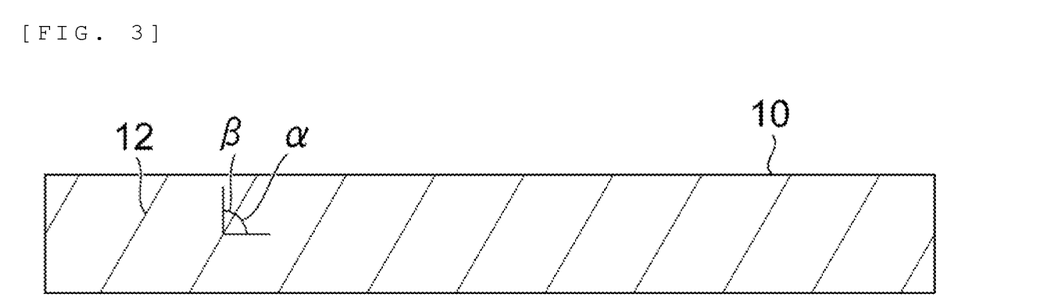
FIG. 3 is an explanatory view explaining a direction of a groove formed on a bar which is used in a bar coater.

FIG. 3 is an explanatory view (plan view) explaining a forming direction of a groove formed on a bar which is used in a bar coater. In the Example shown in FIG. 3, the groove 12 formed on the bar 10 is simply shown by liner lines, but these lines show ridge lines or valley lines of the groove 12.

In FIG. 3, a is an angle between the longitudinal direction of the bar and the direction that the groove is formed on the bar surface, and 13 is an angle between a direction perpendicular to the longitudinal direction of the bar and the direction that the groove is formed (an angle between a direction that the groove is formed and a plane which includes a point on the groove and is perpendicular to the longitudinal (axis) direction of the bar). One of the characteristic features of the present disclosure is using a bar having a groove which is inclined in a way so that the angle α between the longitudinal direction of the bar and the groove forming direction is in a range of 60° to 88°, in other words, the angle β between the groove forming direction of the bar and the direction perpendicular to the longitudinal direction of the bar (moving direction relative to the substrate) is 2° to 30° (hereinafter, this may be expressed that "bar groove angle β is 2° to 30°"). When a bar coater with an ordinary bar (SUS, etc.) wherein the friction coefficient of the material constituting the bar surface does not satisfy the above-mentioned range (the angle α between the longitudinal direction and the groove forming direction on the bar surface being 90°) is used, as the coating velocity decreases, the anisotropy of the resistance value within a plane (in-plane resistance anisotropy) tends to increase. However, the inventor of the present disclosure found out that, when a bar wherein the friction coefficient of the material constituting the bar surface is in the range of 0.05 to 0.45, is used, if a groove inclined as above is formed on the bar, and the printing is performed at the above-mentioned coating velocity V, a conductive layer having a smaller anisotropy of the resistance value within a plane (in-plane resistance anisotropy) can be obtained, and further, a transparent conducting film having a favorable appearance with no stripes can be obtained. Preferably, the angle α between the longitudinal direction and the groove forming direction on the bar surface is in the range of 70° to 88° (the bar groove angle β being 2° to) 20°, and more preferably, the angle α between the longitudinal direction in the bar surface and the groove forming direction is in the range of 75° to 88° (the bar groove angle β being 2° to 15°). It is assumed that the use of a bar on which a groove inclined by the angle as above is formed further induces the phenomenon that the conductive ink favorably flows in the direction perpendicular to the printing direction (lateral direction). Further, as the generation of air bubbles during the coating is particularly remarkable when the coating velocity is high, forming the inclined groove can be effective to reduce the generation of air bubbles, or to make the generated air bubbles disappear. Thereby, the stripes, i.e., longitudinal lines, in the printing direction which seems to be caused by the generation of air bubbles, can be prevented. Even if an ordinary bar (SUS, etc.) with a friction coefficient of 0.45 which shows rather large in-plane resistance anisotropy and/or generates stripes in printing when the angle α between the longitudinal direction of the bar and the groove forming direction is 90°, is used, by forming a groove in a way so that the angle α between the longitudinal direction of the bar and the groove forming direction is inclined from the perpendicular direction, a conductive layer having a small anisotropy of the resistance value within a plane (in-plane resistance anisotropy) can be obtained, and further, a transparent conducting film having a favorable appearance with no stripes can be obtained.

By the above bar-coat printing method, a conducting layer having a small in-plane resistance anisotropy, that is, preferably $(R_{TD})/(R_{MD})$ of 0.7 to 1.3, can be formed on the transparent substrate. The value of $(R_{TD})/(R_{MD})$ is more preferably 0.8 to 1.2, and still more preferably 0.9 to 1.1. Here, $(R_{MD})$ refers to a resistance value of the conducting layer in the coating direction (printing direction) of the conductive ink, and $(R_{TD})$ refers to a resistance value of the conducting layer in the direction perpendicular to the coating direction (printing direction) of the conductive ink.

<Protection Film>

Preferably, a protection film which protects the conducting layer of the transparent conducting film, is provided on the surface of the conducting layer. The protection film is preferably a cured film of a curable resin composite. The curable resin composite preferably comprises (A) a polyurethane containing a carboxy group, (B) an epoxy compound, (C) a curing accelerator, and (D) a solvent. The curable resin composite is applied on the conducting layer by printing, coating, etc., and cured to form the protection film. Curing of the curable resin composite can be performed by heating and drying a thermo-setting resin composite.

The (A) polyurethane containing a carboxy group has a weight-average molecular weight of preferably 1,000 to 100,000, more preferably 2,000 to 70,000, and still more preferably 3,000 to 50,000. The molecular weight is a polystyrene equivalent value measured by gel permeation chromatography (hereinafter, referred to as GPC). If the molecular weight is less than 1,000, the elongation property, the flexibility, and the strength of the printed coating film may be deteriorated. Whereas, if the molecular weight exceeds 100,000, solubility of polyurethane to the solvent decreases, and further, even if polyurethane can dissolve in the solvent, the viscosity becomes too high, resulting in increasing restrictions on use.

In the present specification, unless specifically described, measurement conditions of GPC are as follows.

Device Name: HPLC unit HSS-2000, manufactured by JASCO Corporation

Column: Shodex Colum LF-804

Mobile Phase: tetrahydrofuran

Flow Rate: 1.0 mL/min

Detector: RI-2031 Plus, manufactured by JASCO Corporation

Temperature: 40.0° C.

Sample Volume: sample loop 100 μL

Sample Concentration: Prepared to approximately 0.1% by mass

The (A) polyurethane containing a carboxy group has an acid value of preferably 10 to 140 mg-KOH/g, and more preferably 15 to 130 mg-KOH/g. If the acid value is 10 mg-KOH/g or more, both the curing property and the solvent resistance are superior. If the acid value 140 mg-KOH/g or less, the solubility to the solvent as polyurethane is superior, and adjustment to a desirable viscosity is easy. In addition, problems such that the cured product becomes too hard and warpage, etc., of the substrate film occurs, can be prevented.

Further, in the present specification, the acid value of a resin is a value measured by the following method.

Approximately 0.2 g of sample is precisely weighed by a precision balance into a 100 ml Erlenmeyer flask, and 10 ml of a mixture solvent of ethanol/toluene=1/2 (mass ratio) is provided thereto to dissolve the sample. Further, 1 to 3 drops of a phenolphthalein ethanol solution is added to the container as an indicator, which is sufficiently stirred until the sample becomes uniform. The resultant is subjected to titration with a 0.1 N potassium hydroxide-ethanol solution. When the indicator continues to be in light red for 30 seconds, it is determined that the neutralization ends. The value obtained from the result using the following calculation formula is treated as an acid value of the resin.

Acid Value (mg-KOH/g)=[$B \times f \times 5.611$]/S

B: Use amount (ml) of 0.1 N potassium hydroxide-ethanol solution f: Factor of 0.1 N potassium hydroxide-ethanol solution S: Collection quantity (g) of sample More specifically, the (A) polyurethane containing a carboxy group is polyurethane synthesized by using (a1) a polyisocyanate compound, (a2) a polyol compound, and (a3) a dihydroxy compound containing a carboxy group, as monomers. From the viewpoints of weather resistance and light resistance, preferably, each of (a1), (a2), and (a3) does not contain a functional group with conjugate properties such as an aromatic compound. Hereinbelow, each monomer will be explained in more detail.

(a1) Polyisocyanate Compound

For (a1) polyisocyanate compound, usually, diisocyanate which has two isocyanato groups per molecule is used. Examples of the polyisocyanate compound include: aliphatic polyisocyanate, alicyclic polyisocyanate, and the like. One of them may be used by itself, or two or more of them may be used in combination. As far as (A) polyurethane containing a carboxy group is not turned into a gel, a small amount of polyisocyanate having three or more isocyanato groups may also be used.

Examples of the aliphatic polyisocyanate include: 1,3-trimethylene diisocyanate, 1,4-tetramethylene diisocyanate, 1,6-hexamethylene diisocyanate, 1,9-nonamethylene diisocyanate, 1,10-decamethylene diisocyanate, 2,2,4-trimethylhexamethylene diisocyanate, 2,4,4-trimethylhexamethylene diisocyanate, lysine diisocyanate, 2,2'-diethyl ether diisocyanate, dimer acid diisocyanate, and the like.

Examples of the alicyclic polyisocyanate include: 1,4-cyclohexane diisocyanate, 1,3-bis(isocyanatomethyl)cyclohexane, 1,4-bis(isocyanatomethyl)cyclohexane, 3-isocyanatomethyl-3,5,5-trimethylcyclohexyl isocyanate (IPDI, isophorone diisocyanate), bis-(4-isocyanatocyclohexyl)methane (Hydrogenated MDI), hydrogenated (1,3- or 1,4-)xylylene diisocyanate, norbornane diisocyanate, and the like.

Here, if an alicyclic compound having 6 to 30 carbon atoms other than the carbon atoms in the isocyanato group (—NCO group) is used as (a1) polyisocyanate compound, a protection film formed by the polyurethane resin according to the present aspect has high reliability particularly under high temperature and high humidity, and is suitable as a member for an electronic device component. Among the above examples of the alicyclic polyisocyanate, 1,4-cyclohexane diisocyanate, isophorone diisocyanate, bis-(4-isocyanatocyclohexyl)methane, 1,3-bis(isocyanatomethyl)cyclohexane, and 1,4-bis(isocyanatomethyl)cyclohexane, are preferable.

As mentioned above, from the viewpoints of weather resistance and light resistance, as for (a1) polyisocyanate compound, using a compound which does not have an aromatic ring is preferable. Thus, when the aromatic polyisocyanate or the aromatic-aliphatic polyisocyanate is used in accordance with needs, the content thereof is preferably 50 mol % or less, more preferably 30 mol % or less, and still more preferably 10 mol % or less, relative to the total amount (100 mol %) of (a1) polyisocyanate compound.

(a2) Polyol Compound

The number average molecular weight of (a2) polyol compound (with the proviso that (a2) polyol compound does not include (a3) dihydroxy compound having a carboxy group) is usually 250 to 50,000, preferably 400 to 10,000, and more preferably 500 to 5,000. The molecular weight is a polystyrene equivalent value measured by the GPC under the above-mentioned conditions.

Preferably, (a2) polyol compound is diol having hydroxy groups at both ends. Examples of (a2) polyol compound include: polycarbonate polyol, polyether polyol, polyester polyol, polylactone polyol, polysilicone having hydroxy groups at both ends, and a polyol compound having 18 to 72 carbon atoms obtained by adding hydrogen to a C18 (carbon atom number 18) unsaturated fatty acid made from vegetable oil and a polycarboxilic acid derived from a polymer of the C18 unsaturated fatty acid, and converting the carboxylic acid into hydroxy groups. Among them, in view of the balance of the water resistance, the insulation reliability, and the adhesion to a substrate as a protection film, polycarbonate polyol is preferable.

The polycarbonate polyol can be obtained from diol having 3 to 18 carbon atoms as a raw material, through reaction with carbonate ester or phosgene, and can be represented by, for example, the following structural formula (1):

In Formula (1), $R^3$ represents a residue obtained by removing a hydroxy group from a corresponding diol (HO—$R^3$—OH), which is an alkylene group having 3 to 18 carbon atoms, and $n_3$ represents a positive integer, which is preferably 2 to 50.

Specific examples of the raw material used for producing the polycarbonate polyol represented by Formula (1) include: 1,3-propanediol, 1,4-butanediol, 1,5-pentanediol, 1,6-hexanediol, 3-methyl-1,5-pentanediol, 1,8-octanediol, 1,3-cyclohexanedimethanol, 1,4-cyclohexanedimethanol, 1,9-nonanediol, 2-methyl-1,8-octanediol, 1,10-decamethylene glycol, and 1,2-tetradecanediol, etc.

The polycarbonate polyol may be a polycarbonate polyol (copolymerized polycarbonate polyol) having a plurality of types of alkylene groups in its skeleton. Using a copolymerized polycarbonate polyol is advantageous in many cases from the viewpoint of preventing crystallization of (A) polyurethane containing a carboxy group. Further, taking the solubility to the solvent into account, using, in combination, a polycarbonate polyol having a branched skeleton and having hydroxy groups at the ends of the branched chains, is preferable.

(a3) Dihydroxy Compound Containing Carboxy Group

Preferably, (a3) a dihydroxy compound containing a carboxy group is a carboxylic acid or an amino carboxylic acid having a molecular weight of 200 or less, having two groups selected from a hydroxy group, a hydroxyalkyl group with one carbon, and a hydroxyalkyl group with 2 carbons, because a cross linking point is controllable. Specific examples include: 2,2-dimethylolpropionic acid, 2,2-dimethylolbutanoic acid, N,N-bis hydroxyethyl glycine, N,N-bis hydroxyethyl alanine, and the like. Among them, in view of the solubility to the solvent, 2,2-dimethylolpropionic acid, 2,2-dimethylolbutanoic acid are particularly preferable. One type of the compounds of (a3) dihydroxy compound containing a carboxy group can be used by itself, or two or more types may be used in combination.

The above-mentioned (A) a polyurethane containing a carboxy group can be synthesized from the above three components ((a1), (a2), and (a3)) only. However, (a4) a monohydroxy compound and/or (a5) a monoisocyanate compound may be further reacted for synthesis. In view of the light resistance, using a compound which does not have an aromatic ring and a carbon-carbon double bond in a molecule is preferable.

The above-mentioned (A) polyurethane containing a carboxy group can be synthesized by reacting the above-mentioned (a1) polyisocyanate compound, (a2) polyol compound, and (a3) dihydroxy compound containing a carboxy group, under the presence or absence of a known urethanization catalyst such as dibutyltin dilaurate, using an appropriate organic solvent. However, performing reaction without a catalyst is preferable because there would be no need to concern about the mixing of tin, etc., in the final product.

The organic solvent is not particularly limited as far as the reactivity with the isocyanate compound is low, but a preferable solvent is a solvent free from a basic functional group such as amine, etc., and having a boiling point of 50° C. or higher, preferably 80° C. or higher, and more preferably 100° C. or higher. Examples of such a solvent include: toluene, xylylene, ethylbenzene, nitrobenzene, cyclohexane, isophorone, diethylene glycol dimethyl ether, ethylene glycol diethyl ether, ethylene glycol monomethyl ether acetate, propylene glycol monomethyl ether acetate, propylene glycol monoethyl ether acetate, dipropylene glycol monomethyl ether acetate, diethylene glycol monoethyl ether acetate, methyl methoxypropionate, ethyl methoxypropionate, methyl ethoxypropionate, ethyl ethoxypropionate, ethyl acetate, n-butyl acetate, isoamyl acetate, ethyl lactate, acetone, methyl ethyl ketone, cyclohexanone, N,N-dimethylformamide, N,N-dimethylacetamide, N-methylpyrrolidone, γ-butyrolactone, dimethyl sulfoxide, and the like.

Taking into account that it is not preferable to use an organic solvent in which the polyurethane to be generated does not dissolve well, and that the polyurethane is used as a raw material of an ink for the protection film, in the usage as an electronic material, propylene glycol monomethyl ether acetate, propylene glycol monoethyl ether acetate, dipropylene glycol monomethyl ether acetate, diethylene glycol monoethyl ether acetate, γ-butyrolactone, etc., are particularly preferable among the above.

The addition sequence of the raw materials is not limited, but usually, first, (a2) polyol compound and (a3) dihydroxy compound having a carboxy group are provided, and dissolved or dispersed in the solvent, and thereafter, (a1) polyisocyanate compound is added by dropping at 20 to 150° C., and more preferably at 60 to 120° C., which is then reacted at 30 to 160° C., and preferably at 50 to 130° C.

The molar ratio of the added raw materials is adjusted in accordance with the molecular weight and the acid value of the objected polyurethane.

Specifically, the molar ratio of the provided materials is that isocyanato group of (a1) polyisocyanate compound: (hydroxy group of (a2) polyol compound+hydroxy group of (a3) dihydroxy compound having a carboxy group) is 0.5 to 1.5:1, preferably 0.8 to 1.2:1, and more preferably 0.95 to 1.05:1.

Further, hydroxy group of (a2) polyol compound: hydroxy group (a3) dihydroxy compound having a carboxy group is 1:0.1 to 30, and preferably 1:0.3 to 10.

Examples of (B) epoxy compound include: an epoxy compound having two or more epoxy groups in one molecule, such as bisphenol-A type epoxy resin, hydrogenated bisphenol-A type epoxy resin, bisphenol-F type epoxy resin, novolak type epoxy resin, phenol novolak type epoxy resin, cresol novolak type epoxy resin, N-glycidyl type epoxy resin, bisphenol A novolak type epoxy resin, chelate type epoxy resin, glyoxal type epoxy resin, amino group-containing epoxy resin, rubber-modified epoxy resin, dicyclopentadiene phenolic type epoxy resin, silicone-modified epoxy resin, ε-caprolactone-modified epoxy resin, aliphatic-type epoxy resin containing a glycidyl group, alicyclic epoxy resin containing a glycidyl group, etc.

In particular, an epoxy compound having three or more epoxy groups in one molecule is more preferable. Examples of such an epoxy compound include: EHPE (registered trademark) 3150 (manufactured by Daicel Corporation), jER (registered trademark) 604 (manufactured by Mitsubishi Chemical Corporation), EPICLON (registered trademark) EXA-4700 (manufactured by DIC Corporation), EPICLON (registered trademark) HP-7200 (manufactured by DIC Corporation), pentaerythritol tetraglycidyl ether, pentaerythritol triglycidyl ether, TEPIC (registered trademark) -S (manufactured by Nissan Chemical Corporation), and the like.

The (B) epoxy compound may contain an aromatic ring in a molecule, and in this case, the mass of (B) is preferably 20% by mass or less, relative to the total mass of (A) and (B).

The mixing ratio of (A) polyurethane containing a carboxy group relative to (B) epoxy compound is preferably 0.5 to 1.5, more preferably 0.7 to 1.3, and still more preferably 0.9 to 1.1, in terms of equivalent ratio of the carboxy groups of polyurethane relative to the epoxy groups of (B) epoxy compound.

Examples of (C) curing accelerator include: a phosphine-based compound such as triphenylphosphine, tributylphosphine (manufactured by Hokko Chemical Industry Co., Ltd.), Curezol (registered trademark) (imidazole-based epoxy resin curing agent: manufactured by Shikoku Chemicals Corporation), 2-phenyl-4-methyl-5-hydroxy methyl imidazole, U-CAT (registered trademark) SA series (DBU salt: manufactured by San-Apro Ltd.), Irgacure (registered trademark) 184, and the like. With respect to the used amount of these, if the amount is too small, the effect of addition cannot be obtained, whereas if the amount is too large, the electric insulation is decreased. Therefore, 0.1 to 10% by mass, more preferably 0.5 to 6% by mass, still more preferably 0.5 to 5% by mass, and particularly preferably 0.5 to 3% by mass, is used, relative to the total mass of (A) and (B).

Further, a curing aid may be used together. The curing aid may be a polyfunctional thiol compound, an oxetane compound, and the like. Examples of the polyfunctional thiol compound include: pentaerythritol tetrakis(3-mercaptopropionate), tris-[(3-mercaptopropionyloxy)-ethyl]-isocyanurate, trimethylolpropane tris(3-mercaptopropionate), Karenz (registered trademark) MT series (manufactured by Showa Denko K.K.), and the like. Examples of the oxetane compound include: ARON OXETANE (registered trademark) series (manufactured by Toagosei Co., Ltd.), ETERNACOLL (registered trademark) OXBP or OXMA (manufactured by Ube Industries Ltd.), and the like. With respect to the used amount, if the amount is too small, the effect of addition cannot be obtained, whereas if the amount is too large, the curing rate becomes too high, resulting in decreasing handling property. Therefore, 0.1 to 10% by mass, and preferably 0.5 to 6% by mass is used, relative to the mass of (B).

The content of (D) solvent used in the curable resin composite is preferably 95.0% by mass or more and 99.9% by mass or less, more preferably 96% by mass or more and 99.7% by mass or less, and still more preferably 97% by mass or more and 99.5% by mass or less. (D) solvent can be the solvent used for synthesizing (A) polyurethane containing a carboxy group as it is. Further, other solvent may be used for (D) in order to adjust the solubility of polyurethane or printability. When other solvent is used, the reaction solvent may be distilled away before or after a new solvent is added, to replace the solvent. Taking into account the cumbersomeness of operations and the energy cost, using at least a part of the solvent used for synthesizing (A) polyurethane containing a carboxy group as it is, is preferable. Taking into account the stability of the composite for the protection film, the solvent has a boiling point of preferably 80° C. to 300° C., and more preferably 80° C. to 250° C. If the boiling point is lower than 80° C., drying easily proceeds during the printing, which causes unevenness. If the boiling point is higher than 300° C., heat treatment at a high temperature for a long time is required for drying and curing, which is not suitable for industrial production.

Examples of the solvent include: a solvent used for synthesizing polyurethane such as propylene glycol monomethyl ether acetate (boiling point 146° C.), γ-butyrolactone (boiling point 204° C.), diethylene glycol monoethyl ether acetate (boiling point 218° C.), tripropylene glycol dimethyl ether (boiling point 243° C.), etc., an ether-based solvent such as propylene glycol dimethyl ether (boiling point 97° C.), diethylene glycol dimethyl ether (boiling point 162° C.), etc., a solvent having a hydroxy group such as isopropyl alcohol (boiling point 82° C.), t-butyl alcohol (boiling point 82° C.), 1-hexanol (boiling point 157° C.), propylene glycol monomethyl ether (boiling point 120° C.), diethylene glycol monomethyl ether (boiling point 194° C.), diethylene glycol monoethyl ether (boiling point 196° C.), diethylene glycol monobutyl ether (boiling point 230° C.), triethylene glycol (boiling point 276° C.), ethyl lactate (boiling point 154° C.), etc., and methyl ethyl ketone (boiling point 80° C.), and ethyl acetate (boiling point 77° C.). One of these solvents may be used by itself, or a mixture of two or more types of them may be used. When two or more types of solvents are mixed, using a solvent having a hydroxy group and having a boiling point exceeding 100° C. in view of the solubility of the used polyurethane resin, epoxy resin, etc., and in order to prevent aggregation or precipitation, or using a solvent having a boiling point of 100° C. or lower in view of the drying property of the ink, in addition to the solvent used for synthesizing (A) polyurethane containing a carboxy group, is preferable.

The above-mentioned curable resin composite can be produced by mixing (A) polyurethane containing a carboxy group, (B) epoxy compound, (C) curing accelerator, and (D) solvent so that the content of (D) solvent becomes 95.0% by mass or more and 99.9% by mass or less, and stirring the mixture until the mixture becomes uniform.

The solid content in the curable resin composite may differ depending on the desired film thickness or printing method, but is preferably 0.1 to 10% by mass, and more preferably 0.5% by mass to 5% by mass by mass. If the solid content is within the range of 0.1 to 10% by mass, when the composite is coated on a conducting film, drawbacks such that the electrical contact from silver paste, etc., cannot be obtained due to the too large thickness, do not occur, and a protection film having a sufficient weather resistance and light resistance and a thickness of 50 to 500 nm can be obtained.

From the viewpoint of light resistance, the content of an aromatic ring-containing compound defined by the formula below is restricted to preferably 15% by mass or less, in the protection film (the solid content in the protection film ink, i.e., (A) polyurethane containing a carboxy group, (B) epoxy compound, and curing residue of (C) curing accelerator). Here, considering that all or a part of (C) curing accelerator may disappear (by decomposition, volatilization, etc.) depending on curing conditions, "curing residue of (C) curing accelerator" refers to the (C) curing accelerator which remains in the protection film under the curing conditions. Further, "aromatic ring-containing compound" refers to a compound having at least one aromatic ring in molecule.

[(use amount of aromatic ring-containing compound)/(mass of protection film (mass of (A) polyurethane containing a carboxy group+mass of (B) epoxy compound+curing residue of (C) curing accelerator))]*100(%)

The above-mentioned curable resin composite is used for forming a protection film, by coating the curable resin composite on the transparent substrate (transparent conducting film) having thereon a conducting layer containing metal nanowires using a printing method such as a bar-coating printing, gravure printing, inkjet printing, slit coating, and the like, drying and removing the solvent, and curing the curable resin.

EXAMPLES

Hereinbelow, specific examples of the present disclosure will be specifically explained. The examples are described below for the purpose of easy understanding of the present disclosure, and the present disclosure is not limited to these examples.

<Outline of Transparent Conducting Film Evaluation Method>

A conductive ink containing a silver nanowire, a binder resin, and a solvent was produced, and thereafter, the ink was coated on one main face of the transparent substrate using a bar coater, and dried to form a conducting layer. Subsequently, a protection film ink was produced, which was coated on the conducting layer and dried to form a protection film. Thereby, a transparent conducting film was produced. At this time, the coating direction of the conductive ink on the transparent substrate surface was defined as MD, and the direction perpendicular to the coating direction was defined as TD. A test piece was produced, and a resistance value between two points was measured as mentioned below, to study the in-plane resistance anisotropy of the conducting layer.

Example 1

<Preparation of Silver Nanowire>

Polyvinylpyrrolidone K-90 (manufactured by Nippon Shokubai Co., Ltd.) (0.98 g), AgNO$_3$ (1.04 g), and FeCl$_3$ (0.8 mg) were dissolved in ethylene glycol (250 ml), and subjected to thermal reaction at 150° C. for one hour. The obtained silver nanowire coarse dispersion liquid was dispersed in 2000 ml of methanol, which was poured into a desktop small tester (using ceramic membrane filter Cefilt, membrane area: 0.24 m$^2$, pore size: 2.0 μm, size Φ: 30 mm×250 mm, filter differential pressure: 0.01 MPa, manufactured by NGK Insulators, Ltd.), and was subjected to cross-flow filtration at a circulation flow rate of 12 L/min and a dispersion liquid temperature of 25° C., to remove impurities, and to thereby obtain silver nanowires (average diameter: 26 nm, average length: 20 μm). The average diameter of the obtained silver nanowires was obtained by measuring diameters of arbitrarily selected 100 silver nanowires using Field Emission Scanning Electron Microscope JSM-7000F (manufactured by JEOL Ltd.), and calculating the arithmetic average value of the measurement results. Further, the average length of the obtained silver nanowires was obtained by measuring lengths of arbitrarily selected 100 silver nanowires using the Shape Measurement Laser Microscope VK-X200 (manufactured by Keyence Corporation), and calculating the arithmetic average value of the measurement results. For the methanol, ethylene glycol, AgNO$_3$, and FeCl$_3$, those manufactured by FUJIFILM Wako Pure Chemical Corporation were used.

<Preparation of Conductive Ink (Silver Nanowire Ink)>

11 g of dispersion liquid having a water/methanol/ethanol mixture solvent and silver nanowires synthesized by the above polyol method (silver nanowire concentration: 0.62% by mass, water/methanol/ethanol=10:20:70 [mass ratio]), 2.4 g of water, 3.6 g of methanol (manufactured by FUJIFILM Wako Pure Chemical Corporation), 8.3 g of ethanol (manufactured by FUJIFILM Wako Pure Chemical Corporation), 12.8 g of propyleneglycol monomethyl ether (PGME, manufactured by FUJIFILM Wako Pure Chemical Corporation), 1.2 g of propylene glycol (PG, manufactured by AGC Inc.), and 0.7 g of PNVA (registered trademark) aqueous solution (solid content concentration: 10% by mass, weight-average molecular weight: 900,000, manufactured by Showa Denko K.K.) were mixed and stirred by Mix Rotor VMR-5R (manufactured by AS ONE Corporation) for 1 hour, at a room temperature and under an air atmosphere (rotation speed: 100 rpm), to thereby produce 40 g of silver nanowire ink.

Table 1 shows concentrations of the silver nanowires in the obtained silver nanowire inks and viscosities of the silver nanowire inks. The silver concentration of the obtained silver nanowire ink was measured by AA280Z Zeeman atomic absorption spectrophotometer, manufactured by Varian. The viscosity was measured at 25° C., by the digital viscometer DV-E (spindle: SC4-18) manufactured by Brookfield.

<Forming Conducting Layer (Silver Nanowire Layer)>

As a transparent substrate, a cyclo olefin polymer (COP) film ZF14 (glass transition temperature: 136° C. [catalog value], thickness: 100 μm, manufactured by Zeon Corporation) of A4 size was subjected to plasma treatment (used gas: nitrogen, feed speed: 50 mm/sec, treatment time: 6 sec, set voltage: 400 V) using a plasma processing equipment (AP-T03 manufactured by Sekisui Chemical Co., Ltd.). A silver nanowire ink was coated on the entire surface of one main face of the transparent substrate (ZF14-100) at a room temperature and under an air atmosphere (coating speed V: 500 mm/sec), by using TQC Automatic Film Applicator Standard (manufactured by COTEC Corporation), and wireless bar OSP-CN-22L15° (groove shape of bar: S-shape/pitch(P): 500 μm, depth(H): 44 μm, P/H: 11.4, bar surface: SUS304 (friction coefficient: 0.45, groove angle β: 15°, manufactured by COTEC Corporation). Thereafter, the coated film was subjected to hot-air drying at 80° C., for 1 minute, and under an air atmosphere, by using a constant temperature oven HISPEC HS350 (manufactured by Kusumoto Chemicals Ltd.), and thereby a silver nanowire layer was obtained.

<Film Thickness Measurement>

The thickness of the conducting layer (silver nanowire layer) was measured by a film thickness measurement system F20-UV (manufactured by Filmetrics Corporation), based on optical interferometry. Measurement was performed at three different points, and an average value thereof was used as a thickness. For analysis, 450 nm to 800 nm spectrum was used. According to this measurement system, the thickness (Tc) of the silver nanowire layer formed on the transparent substrate can be directly measured. The measurement results are shown in Table 1.

Preparation of Curable Resin Composite

Synthesis Example of (A) Polyurethane Containing Carboxy Group

Synthesis Example 1: Synthesis of Original Resin Used for Curable Resin composite OC022

42.32 g of C-1015N (polycarbonate diol, molar ratio of raw material diols: 1,9-nonanediol:2-methyl-1,8-octanediol=15:85, molecular weight: 964, manufactured by Kuraray Co., Ltd.) as a polyol compound, 27.32 g of 2,2-dimethylol butanoic acid (manufactured by Nihon Kasei Co., Ltd.) as a dihydroxy compound containing a carboxy group, and 158 g of diethylene glycol monoethyl ether acetate (manufactured by Daicel Corporation) as a solvent were provided in a 2 L three-neck flask having a stirrer, a thermometer, and a condenser, and the 2,2-dimethylol butanoic acid was dissolved at 90° C.

The temperature of the reaction liquid was lowered to 70° C., and 59.69 g of Desmodur (registered trademark)-W (bis-(4-isocyanatocyclohexyl)methane), manufactured by Sumika Covestro Urethane Co., Ltd.) as polyisocyanate was dropped thereto for 30 minutes by a dropping funnel. After the dropping was complete, the temperature was raised to 120° C., and the reaction was performed at 120° C. for 6 hours. After the confirmation by IR that almost all of the isocyanato groups disappeared, 0.5 g of isobutanol was added, which was further reacted at 120° C. for 6 hours. The obtained carboxy group-containing polyurethane had a weight average molecular weight, obtained by GPC, of 32300, and a resin solution thereof had an acid value of 35.8 mgKOH/g.

Curable Resin Composite Example 1

10.0 g of above obtained (A) polyurethane containing a carboxy group solution (content of polyurethane containing a carboxy group: 45% by mass) was weighed in a polyethylene container, and 85.3 g of 1-hexanol and 85.2 g of ethyl acetate as (D) solvent were added thereto, which was stirred by Mix Rotor VMR-5R (manufactured by AS ONE Corporation) for 12 hours, at a room temperature and under an air atmosphere (rotation speed: 100 rpm). When the mixture was visually confirmed as being uniform, 0.63 g of pentaerythritol tetraglycidyl ether (manufactured by Showa Denko K.K.) as (B) epoxy compound and 0.31 g of U-CAT (registered trademark) 5003 (manufactured by San-Apro Ltd.) as (C) curing accelerator, were added thereto, which were stirred again by Mix Rotor for 1 hour. Thereby, a curable resin composite example 1 (protection film ink example 1) was obtained. The ratio of the curing accelerator, i.e., an aromatic ring-containing compound in the solid content of the curable resin composite example 1 (protection film formed by the curable resin composite example 1) was 5.7% by mass.

<Forming Protection Film>

The protection film ink example 1 was coated on the silver nanowire layer formed on the transparent substrate (coating velocity V 500 mm/sec) as below, by using TQC Automatic Film Applicator Standard (manufactured by COTEC Corporation). Coating was performed at a room temperature and under an air atmosphere using a wireless bar OSP-CN-05M, to have a wet film thickness of 5 μm. Thereafter, the coated film was subjected to hot-air drying at 80° C., for 1 minute, and under an air atmosphere, by using a constant temperature oven HISPEC HS350 (manufactured by Kusumoto Chemicals Ltd.), and thereby a protection film (film thickness: 80 nm) was obtained. This was a transparent conducting film of Example 1.

<Film Thickness Measurement>

Same as the above-mentioned film thickness measurement of the silver nanowire layer, the film thickness of the protection film was measured by a film thickness measurement system F20-UV (manufactured by Filmetrics Corporation), based on optical interferometry. Measurement was performed at three different points, and an average value thereof was used as a thickness. For analysis, 450 nm to 800 nm spectrum was used. According to this measurement system, the total thickness ($T_c+T_p$) can be directly measured, where the thickness ($T_c$) is the thickness of the silver nanowire layer formed on the transparent substrate, and the thickness ($T_p$) is the thickness of the protection film formed on the silver nanowire layer. Therefore, by subtracting the previously measured thickness ($T_a$) of the silver nanowire layer from the total thickness ($T_c+T_p$), the thickness ($T_p$) of the protection film can be obtained.

<Measurement of Resistance Value Between Two Points>

A test piece was made by cutting a A4-size transparent conducting film into a 20 mm*50 mm size, and forming terminals with a silver paste on the protection film so that the distance between the terminals was 40 mm. For the silver paste, the conductive paste DW-420L-2A (manufactured by Toyobo Co., Ltd.) was used. The paste was coated by hand to be a square of approximately 2 mm, which was subjected to hot-air drying in the constant temperature oven HISPEC HS350 (manufactured by Kusumoto Chemicals Ltd.), at 80° C., for 30 minutes, under an air atmosphere. Thereby, terminal portions were made. Thereafter, the resistance value between the terminals was measured. Because the protection film was thin (the silver nanowire was projected from the surface of the protection film), the silver paste is conductive with the conducting layer. In order to electrically connect the transparent conducting pattern using the silver nanowires and the conductive paste pattern, a part of the silver nanowire (the end of the wire, the intersection of wires where wires are raised in the height direction) should be exposed from the surface of the overcoat layer (protection film). The more the exposed portions, the easier the electrical connection between the transparent conducting pattern using the silver nanowires and the conductive paste pattern. The preferable thickness of the overcoat layer may depend on the shape (diameter, length) of the silver nanowire, and the number of silver nanowires coated on the substrate, and thus, cannot be generally determined. However, when the thickness of the overcoat layer is small, i.e., for example 500 nm or less, preferably 200 nm or less, and more preferably 100 nm or less, the number of exposed portions becomes sufficient for obtaining the electrical connection. In the present Example, the overcoat layer is thin with a thickness 80 nm, and thus, the silver paste is conductive with the conducting layer. When the overcoat layer is thick and obtaining the electrical connection is difficult, the overcoat layer may be removed by a known etching technology, to expose the silver nanowires.

Figure 2A:
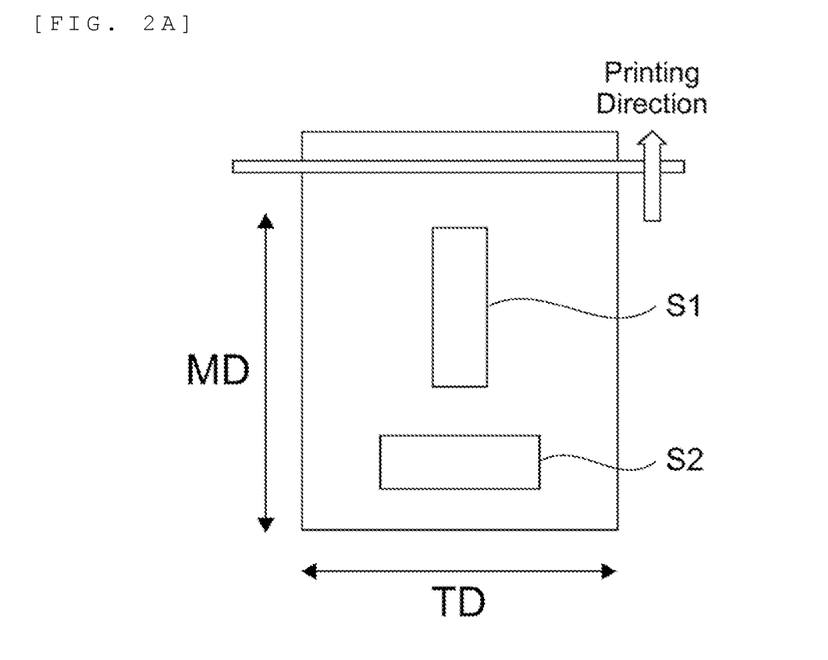
FIGS. 2A and 2B is are explanatory views showing a method for measuring a resistance value.
Figure 2B:
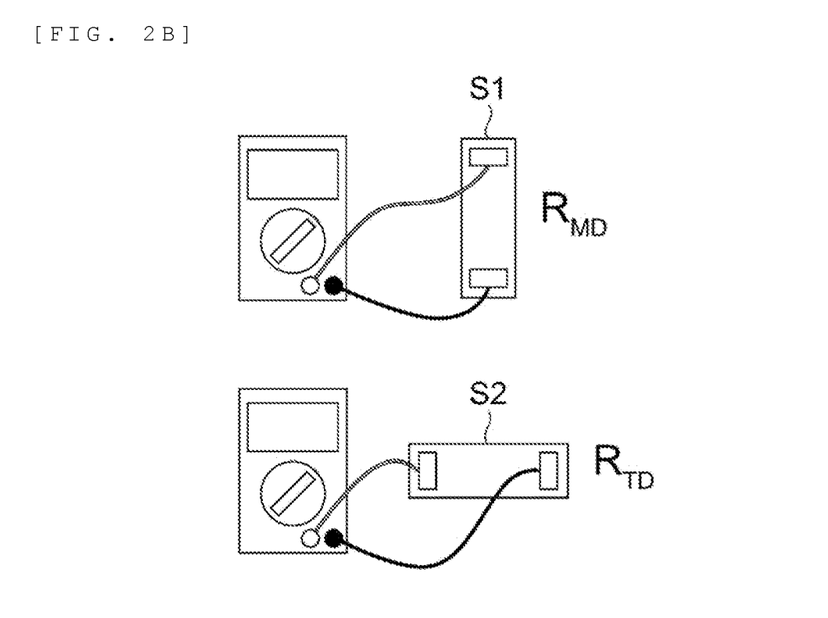

FIG. 2A and FIG. 2B show explanatory views explaining a resistance value measurement method. In FIG. 2A, the coating direction (printing direction) is shown by the arrow. Sample 51 was cut out to have its longitudinal direction in the coating direction. Sample S2 was cut out to have its longitudinal direction in the direction perpendicular to the coating direction.

Next, as shown in FIG. 2B, regarding each of Sample 51 and Sample S2, the resistance value between the silver paste terminals formed by the above-mentioned method was measured by Digital Multimeter PC5000a (manufactured by Sanwa Electric Instrument Co., Ltd.). The resistance value ($R_{MD}$) of Sample S1 coated and cut out as above, and the resistance value ($R_{TD}$) of Sample S2 were respectively measured, and a resistance value ratio ($R_{TD}$)/($R_{MD}$) was calculated, to thereby evaluate the in-plane resistance anisotropy.

<Sheet Resistance Measurement>

A test piece of 3 cm*3 cm was cut out from the above-mentioned A4-size transparent conducting film. A probe of a manual type non-contact resistance measurement instrument EC-80P (manufactured by Napson Corporation) was placed at the center of the protection film of the test piece, and measurement was performed. The measurement results are shown in Table 1.

<Measurement of Total Light Transmittance and Haze>

Using the above 3 cm*3 cm test piece, measurement was performed by Haze meter NDH 2000 (manufactured by Nippon Denshoku Industries Co., Ltd.). The measurement results are shown in Table 1.

Example 2

Except that the coating velocity V of the silver nanowire ink was 350 mm/sec, other conditions were the same as those of Example 1. The results are shown in Table 1.

Example 3

Except that a wireless bar OSP-CN-22L-2° (manufactured by Cotec Corporation, bar groove shape: S-shape/pitch (P): 500 μm, depth (H): 42 μm, P/H: 11.9, bar surface: SUS304 (friction coefficient: 0.45), groove angle β: 2°) was used, other conditions were the same as those of Example 1. The results are shown in Table 1.

Comparative Example 1

Except that a wireless bar OSP-CN-22L-1° (manufactured by Cotec Corporation, bar groove shape: S-shape/pitch (P): 500 μm, depth (H): 42 μm, P/H: 11.9, bar surface: SUS304 (friction coefficient: 0.45), groove angle β: 1°) was used, other conditions were the same as those of Example 1. The results are shown in Table 1.

Comparative Example 2

Except that a wireless bar OSP-CN-22L (manufactured by Cotec Corporation, bar groove shape: S-shape/pitch (P): 500 μm, depth (H): 42 μm, P/H: 11.9, bar surface: SUS304 (friction coefficient: 0.45), groove angle β: 0°) was used, other conditions were the same as those of Example 1. The results are shown in Table 1.

Comparative Example 3

Except that the coating velocity V of the silver nanowire ink was 300 mm/sec, other conditions were the same as those of Example 1. The results are shown in Table 1.

Comparative Example 4

Except that the coating velocity V of the silver nanowire ink was 100 mm/sec, other conditions were the same as those of Example 1. The results are shown in Table 1.

Comparative Example 5

Except that a wireless bar OSP-CN-22L-15°, treated by chrome plating (manufactured by Cotec Corporation, bar groove shape: S-shape/pitch (P): 500 μm, depth (H): 44 μm, P/H: 11.4, bar surface: treated by chrome plating (friction coefficient: 0.70), groove angle β: 15°) was used, other conditions were the same as those of Example 1. The results are shown in Table 1.

Comparative Example 6

Except that a wireless bar OSP-CN-22M (manufactured by Cotec Corporation, bar groove shape: S-shape/pitch (P): 250 μm, depth (H): 40 P/H: 6.3, bar surface: SUS304 (friction coefficient: 0.45), groove angle β: 15° as used, other conditions were the same as those of Example 1. The results are shown in Table 1.

Comparative Example 7

Except that a wireless bar OSP-CN-22L, treated by chrome plating (manufactured by Cotec Corporation, bar groove shape: S-shape/pitch (P): 500 μm, depth (H): 42 μm, P/H: 11.9, bar surface: treated by chrome plating (friction coefficient: 0.70), groove angle β: 0°) was used, and the coating velocity V of the silver nanowire ink was 333 mm/sec, other conditions were the same as those of Example 1. The results are shown in Table 1.

9 or more, and having a friction coefficient on the bar surface of 0.45 or less, was used, and a coating velocity V is 350 mm/sec or more, $R_{TD}/R_{MD}$ was a preferable result of 1.3 or less, and a transparent conducting film having a small in-plane resistance anisotropy was obtained. The reason therefor is believed that, when the bar groove has a pitch (P)/depth (H) ratio [P/H] of a certain value or more, the phenomenon that the silver nanowire ink tends to flow in the lateral direction is induced, and the phenomenon moderates the orientation of the metal nanowires to the printing direction, resulting in making the directions of the silver nanowires close to random. Further, when the bar surface has a small friction coefficient, the phenomenon that the silver nanowire ink tends to flow in the lateral direction is further induced, resulting in making the directions of the silver nanowires further closer to random.

On the other hand, in Comparative Example 3 and Comparative Example 4 in each of which the bar groove shape satisfied a pitch (P)/depth (H) of 9 or more and a groove angle β of 15°, but the print speed was 350 mm/sec or less, the in-plane resistance anisotropy $((R_{TD})/(R_{MD}))$ was 1.40 or more. In Comparative Example 5 in which the bar groove shape satisfied a pitch (P)/depth (H) of 9 or more and a groove angle β of 15°, but the bar surface had a friction coefficient exceeding 0.45, the in-plane resistance anisotropy $((R_{TD})/(R_{MD}))$ was 1.68. In Comparative Example 6 in which the print speed was 350 mm/sec or more and the groove angle β was 15°, but the bar groove shape had a pitch

TABLE 1

| | | Unit | Ex. 1 | Ex. 2 | Ex. 3 | Com. Ex. 1 | Com. Ex. 2 | Com. Ex. 3 | Com. Ex. 4 | Com. Ex. 5 | Com. Ex. 6 | Com. Ex. 7 |
|---|---|---|---|---|---|---|---|---|---|---|---|---|
| Silver Nanowire Average Diameter | | nm | 26 | 26 | 26 | 26 | 26 | 26 | 26 | 26 | 26 | 26 |
| Silver Nanowire Average Length | | μm | 20 | 20 | 20 | 20 | 20 | 20 | 20 | 20 | 20 | 20 |
| Silver Concentration of Ink | | mass % | 0.17 | 0.17 | 0.17 | 0.17 | 0.17 | 0.17 | 0.17 | 0.17 | 0.17 | 0.17 |
| Binder Resin | | Type | PNVA | PNVA | PNVA | PNVA | PNVA | PNVA | PNVA | PNVA | PNVA | PNVA |
| Ink Viscosity | | mPa · s (25° C.) | 4.1 | 4.1 | 4.1 | 4.1 | 4.1 | 4.1 | 4.1 | 4.1 | 4.1 | 4.1 |
| Bar Shape | Shape | | S | S | S | S | S | S | S | S | S | S |
| | Pitch (P) | μm | 500 | 500 | 500 | 500 | 500 | 500 | 500 | 500 | 250 | 500 |
| | Depth (H) | μm | 44 | 44 | 42 | 42 | 42 | 44 | 44 | 44 | 40 | 42 |
| | P/H | | 11.4 | 11.4 | 11.9 | 11.9 | 11.9 | 11.4 | 11.4 | 11.4 | 6.3 | 11.9 |
| | groove angle (β) | degree | 15 | 15 | 2 | 1 | 0 | 15 | 15 | 15 | 15 | 0 |
| Bar Surface | SUS304 Hard Chrome Plating | (Friction Coefficient) | 0.45 | 0.45 | 0.45 | 0.45 | 0.45 | 0.45 | 0.45 | 0.70 | 0.45 | 0.70 |
| Coating Velocity | V | mm/sec | 500 | 350 | 500 | 500 | 500 | 300 | 100 | 500 | 500 | 333 |
| Silver Nanowire Layer Thickness | | nm | 90 | 90 | 90 | 90 | 90 | 90 | 90 | 90 | 70 | 90 |
| Film Substrate | | | COP | COP | COP | COP | COP | COP | COP | COP | COP | COP |
| Resistance Value | MD | Ω | 77.7 | 80.7 | 82.2 | 91.9 | 84.6 | 94.0 | 67.8 | 55.0 | 76.9 | 58.6 |
| | TD | Ω | 100 | 104 | 99.3 | 106 | 89.9 | 153 | 95.1 | 92.6 | 140 | 90.1 |
| | TD/MD | | 1.29 | 1.29 | 1.21 | 1.15 | 1.06 | 1.64 | 1.40 | 1.68 | 1.82 | 1.54 |
| Appearance: P(presence)/A(absence) of Longitudinal Line | | | A | A | A | P | P | A | A | A | A | A |
| Sheet Resistance | | Ω/□ | 42 | 36 | 56 | 39 | 40 | 44 | 38 | 38 | 63 | 40 |
| Total Light Transmittance | | % | 89 | 89 | 89 | 89 | 90 | 89 | 89 | 89 | 90 | 90 |
| Haze | | % | 0.71 | 0.82 | 1.01 | 0.96 | 0.81 | 0.91 | 0.87 | 0.88 | 0.74 | 0.91 |

As shown in Table 1, in Example 1 (groove angle β being 15°), Example 2 (groove angle β being 15°), and Example 3 (groove angle β being 2°) in each of which a wireless bar having a bar groove with a pitch (P)/depth (H) ratio [P/H] of 9 or more, the in-plane resistance anisotropy $((R_{TD})/(R_{MD}))$ was 1.82. It is believed that flows of the silver nanowire ink in the lateral direction were not sufficiently induced.

As shown in Table 1, in Example 1 to Example 3 using a bar with a groove angle β of 2° or more, the external appearance did not show any longitudinal lines. The reason therefor is believed that, when the bar was visually observed during the coating, in case that the groove angle β was less than 2° and the print speed was 500 mm/sec (Comparative Example 1, and Comparative Example 2), air bubbles were generated in the shape of longitudinal line in the printing direction, immediately after the coating by the bar; whereas, in case that the bar had a groove angle β of 2° or more, air bubbles were hardly generated.

When the print speed was 333 mm/sec, no air bubbles were generated. Therefore, in Comparative Example 7 satisfying this condition, no longitudinal lines were found. In view of the results, it is believed that the air bubbles were generated because the bar was rotated at a high speed.

In case that the groove angle β was 15°, no air bubbles were generated at any print speed. Therefore, no longitudinal lines were found in the external appearance of the coated film.

Namely, by the method for producing a transparent conducting film according to the present disclosure, a transparent conducting film having almost no in-plane resistance anisotropy, and having a preferable external appearance, can be achieved.

EXPLANATION ON NUMERALS

10 bar
12 groove

The invention claimed is:

1. A method for producing a transparent conducting film provided with a conducting layer containing metal nanowires and a binder resin, comprising steps of:
   preparing a coating liquid containing the metal nanowires and the binder resin, and
   coating the coating liquid on one main face of a transparent substrate, the coating step being performed by a bar-coater with a bar which has a bar surface constituted by a material having a friction coefficient of 0.05 to 0.45, wherein
   when the coating liquid is coated on one main face of the transparent substrate by the bar, a relative moving velocity (coating velocity) V (mm/sec) of the transparent substrate relative to the bar satisfies 2000≥V≥350,
   a groove formed on the bar has a pitch (P) and a depth (H) which satisfy a ratio P/H of 9 to 30, and
   on the bar surface, the groove is formed to be inclined in a way so that an angle between a longitudinal direction of the bar and a direction that the groove is formed is in a range of 60° to 88°.

2. A method for producing a transparent conducting film according to claim 1, wherein the metal nanowires have an average length of 1 to 100 μm, and an average diameter of 1 to 500 nm.

3. A method for producing a transparent conducting film according to claim 1, wherein the coating liquid has a viscosity in a range of 1 to 50 mPa·s at 25° C.

4. A method for producing a transparent conducting film according to claim 2, wherein the coating liquid has a viscosity in a range of 1 to 50 mPa·s at 25° C.

* * * * *